United States Patent
Tsai

(10) Patent No.: US 7,847,899 B2
(45) Date of Patent: Dec. 7, 2010

(54) NO-CONTACT ALIGNMENT APPARATUS AND NO-CONTACT ALIGNMENT METHOD

(75) Inventor: Ming-Hung Tsai, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 1073 days.

(21) Appl. No.: 11/590,701

(22) Filed: Oct. 30, 2006

(65) Prior Publication Data

US 2007/0096043 A1    May 3, 2007

(30) Foreign Application Priority Data

Oct. 28, 2005    (TW) .............................. 94137849 A

(51) Int. Cl.
G02F 1/1337  (2006.01)
G02F 1/1335  (2006.01)

(52) U.S. Cl. ............................ 349/123; 349/124; 349/5; 349/9

(58) Field of Classification Search .................. 349/123, 349/124, 5, 9
See application file for complete search history.

(56) References Cited

U.S. PATENT DOCUMENTS

| 5,075,790 | A | 12/1991 | Hayashi et al. |
| 5,400,422 | A | 3/1995 | Askins et al. |
| 5,879,497 | A | 3/1999 | Nakahara et al. |
| 6,213,606 | B1 * | 4/2001 | Holman et al. ................. 353/20 |
| 7,221,420 | B2 * | 5/2007 | Silverstein et al. .......... 349/117 |
| 2004/0149684 | A1 | 8/2004 | Wu |
| 2010/0035190 | A1 * | 2/2010 | Jung et al. ................... 430/322 |

FOREIGN PATENT DOCUMENTS

TW    584773 B    4/2004

* cited by examiner

*Primary Examiner*—Mike Qi
(74) *Attorney, Agent, or Firm*—Wei Te Chung

(57) ABSTRACT

An exemplary alignment apparatus (2) includes a light source (50) for emitting light (501), a polarized light generator (51) for receiving the light and generating polarized light (504), a polarized light separator (52) for receiving the polarized light and separating the polarized light into a reflection polarized light beam (521) and a transmission polarized light beam (522) having capability to interfere with each other, a light reflector for changing transmission directions of the reflection and transmission polarized light beams to make the reflection and transmission polarized light beams parallel to each other, and a convergent lens (53) for making the reflection and transmission polarized light beams converge and interferingly irradiate a photosensitive polymer layer (30) to obtain an alignment layer (60). Unlike with conventional alignment apparatuses, because the alignment apparatus is no-rubbing, no-contact alignment apparatuses, debris and electrostatic charge are avoided or even eliminated.

20 Claims, 5 Drawing Sheets

NO-CONTACT ALIGNMENT APPARATUS AND NO-CONTACT ALIGNMENT METHOD

CROSS-REFERENCE TO RELATED APPLICATION

This application is related to, and claims the benefit of, a foreign priority application filed in Taiwan as Serial No. 094137849 on Oct. 28, 2005. The related application is incorporated herein by reference.

FIELD OF THE INVENTION

The present invention relates to alignment apparatuses such as those used to make alignment layers of liquid crystal displays, and particularly to a no-contact alignment apparatus and a no-contact alignment method.

GENERAL BACKGROUND

A typical liquid crystal display (LCD) is capable of displaying a clear and sharp image through millions of pixels that make up the complete image. The liquid crystal display has thus been applied to various electronic equipment in which messages or pictures need to be displayed, such as mobile phones and notebook computers.

In the manufacture of a typical LCD, an essential requirement is the alignment of liquid crystal molecules on a surface of an alignment layer (hereinafter "alignment surface") of the LCD. The liquid crystal molecules are placed on the alignment surface prior to the formation of the LCD cell that contains the alignment layer and the liquid crystal molecules. The most widely used method for producing the alignment surface is to coat a film, such as a polyimide film, on a base layer such as a glass substrate. The polyimide film forms the base material of the alignment layer. The surface of the polyimide film coating is then rubbed with a velvet cloth. This rubbing process realigns the polyimide surface to form the alignment surface. The alignment surface provides a directional template for the alignment of the liquid crystal molecules in contact with the surface.

The rubbing method has been the process of choice for as much as the last three decades in order to provide alignment surfaces required for LCDs. However, the LCD industry has recognized that a non-rubbing method or a non-contact method of surface alignment would be very desirable for manufacturing in the future. This is because the rubbing process introduces debris from the cloth into an otherwise unpolluted clean room environment. The rubbing process can also lead to electrostatic charge build up, which can destroy transistors located on the glass substrate below the polyimide surface. Since these transistors are essential for the operation of modern LCDs. Therefore it is especially important that forming the alignment surface does not threaten the viability of these transistors.

What is needed, therefore, is a no-contact alignment apparatus for producing an alignment surface. What is also needed is a no-contact alignment method for producing an alignment surface.

SUMMARY

In one preferred embodiment, an alignment apparatus includes: a light source for emitting light; a polarized light generator for receiving the light and generating polarized light; a polarized light separator for receiving the polarized light and separating the polarized light into two polarized light beams having capability to interfere with each other; and a light directing member for making the two interfering polarized light beams converge and interferingly irradiating a photosensitive polymer layer to obtain an alignment layer.

Other advantages and novel features will become more apparent from the following detailed description when taken in conjunction with the accompanying drawings. In the drawings, all the views are schematic.

DETAILED DESCRIPTION OF PREFERRED EMBODIMENTS

Figure 1:
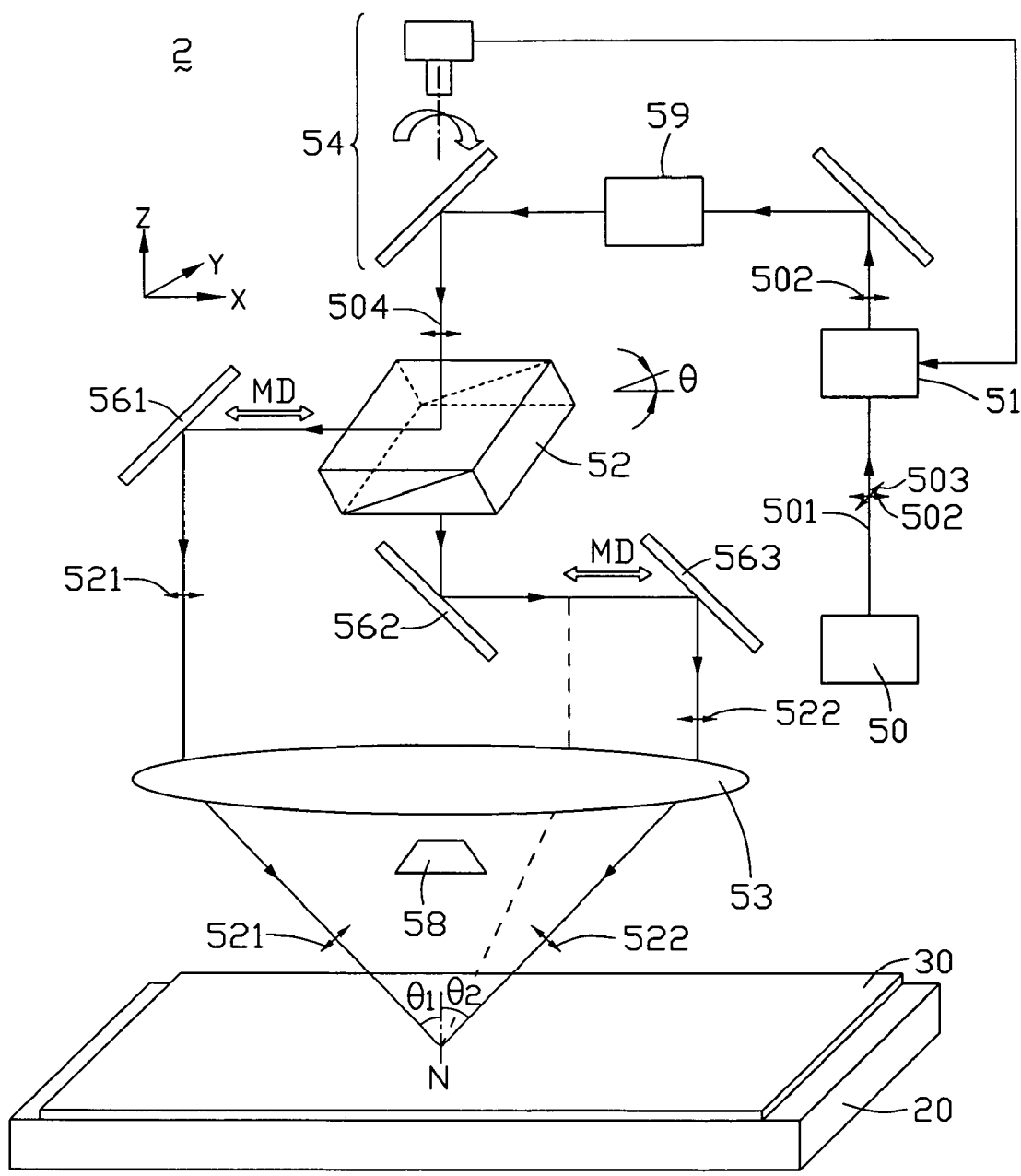
FIG. 1 is a diagram of an alignment apparatus according to a first embodiment of the present invention, showing aspects of operation of the alignment apparatus including essential optical paths.

Referring to FIG. 1, an alignment apparatus 2 according to a first embodiment of the present invention is shown. The alignment apparatus 2 includes a light source 50, a polarized light generator 51, a polarized light separator 52, a light controller 54, a light reflector (not labeled), a convergent lens 53, a vent-pipe 58, and a light intensity controller 59. The light source 50 is a high voltage light source, and emits ultraviolet light. The polarized light generator 51 generates a linear polarized light beam, and the polarized light separator 52 separates the polarized light beam into two polarized light beams by way of internal reflection and transmission of the polarized light beam. The light reflector includes a first reflecting mirror 561, a second reflecting mirror 562, and a third reflecting mirror 563. The light reflector changes a direction of a reflection polarized light beam passing therethrough and a direction of a transmission polarized light beam passing therethrough, such that the reflection polarized light beam and the transmission polarized light beam are output parallel to each other. Then when the two parallel interfering reflection and transmission polarized light beams pass through the convergent lens 53, they converge at a target location.

A light beam emitted from the light source 50 sequentially passes through the polarized light generator 51, the light intensity controller 59, the light controller 54, the polarized light separator 52, the light reflector, and the convergent lens 53, and finally irradiates a photosensitive polymer layer 30 coated on a substrate 20 in order to obtain an alignment layer on the substrate 20.

Referring also to FIG. 2 through FIG. 6, various aspects of operation of the alignment apparatus 2 are shown.

Figure 2:
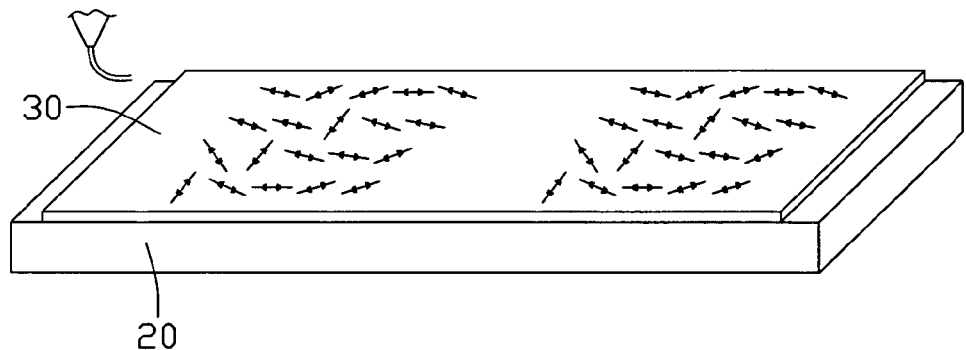
FIG. 2 is a schematic, isometric view relating to coating of a photosensitive polymer layer on a substrate by operation of the alignment apparatus of FIG. 1.

Referring to FIG. 2, a substrate 20 is provided. An amount of photosensitive polymer is formed on the substrate 20 by a spin-coating method, thereby obtaining a photosensitive polymer layer 30 on the substrate 20. Orientations of molecules of the photosensitive polymer layer 30 are disorderly and unsystematic due to molecular forces therebetween.

Referring to FIGS. 1 and 2, the light source 50 emits horizontal deep-ultraviolet (deep-UV) light 501 in cooperation with filters (not shown). In order to meet requirements of the photosensitive polymer, a wavelength of the deep-UV light 501 is preferably in the range from 100 to 250 nanometers. The deep-UV light 501 is an electromagnetic wave transmitting along a Z-axis, and includes a horizontal electric-field component 502 measured along an X-axis and a vertical electric-field component 503 measured along a Y-axis. The horizontal electric-field component 502 and the vertical electric-field component 503 are located in a same XY plane, which is perpendicular to the Z-axis.

The polarized light generator 51 receives the deep-UV light 501, and transforms the deep-UV light 501 into a deep-UV linear polarized light beam 504 only having the horizontal electric-field component 502 or deep-UV linear polarized light beam 504 only having the vertical electric-field component 503. In the illustrated embodiment, the deep-UV light 501 is transformed into a deep-UV polarized light beam 504 only having the horizontal electric-field component 502.

The light intensity controller 59 is disposed next the polarized light generator 51, and is used to adjust an intensity of the polarized light beam 504 when the polarized light beam 504 passes therethrough.

The light controller 54 and the polarized light separator 52 are disposed next in order in that sequence after the light intensity controller 59. The light controller 54 includes a reflecting plate (not labeled) and a controller (not labeled). The reflecting plate reflects the polarized light beam 504 from the light intensity controller 59 to the polarized light separator 52. By operation of the controller, an angle of the reflecting plate relative to the horizontal plane can be adjusted, such that an incident angle of the polarized light beam 504 relative to the polarized light separator 52 is adjusted appropriately. The polarized light beam 504 from the reflecting plate enters the polarized light separator 52 with an incident angle ($\omega/2-\theta$), wherein $\omega$ represents a rotation angle of the reflecting plate as adjusted by the controller, and $\theta$ represents an angle of the polarized light separator 52 relative to the horizontal plane. When $\theta$ is kept constant, $\omega$ determines the incident angle ($\omega/2-\theta$). If the rotation of the reflecting plate as adjusted by the controller brings deflection of the polarized light beam 504, the light controller 54 sends a feedback signal to the polarized light generator 51, and an incident angle of the polarized light beam 504 relative to the polarized light separator 52 can be adjusted according to the feedback signal.

The polarized light separator 52 may be a transmission optical splitter. The polarized light separator 52 receives the polarized light beam 504 having the horizontal electric-field component 502, and separates the polarized light beam 504 into a reflection polarized light beam 521 measured along the X-axis and a transmission polarized light beam 522 measured along the Y-axis. The reflection and transmission polarized light beams 521, 522 have a same frequency, and the capability to interfere with each other.

The first reflecting mirror 561 of the light reflector is disposed in the optical path of the reflection polarized light beam 521. The second and third reflecting mirrors 562, 563 of the light reflector are disposed in the optical path of the transmission polarized light beam 522. The three reflecting mirrors 561, 562, 563 are used to change transmission directions of the reflection and transmission polarized light beams 521, 522, so as to output the reflection transmission polarized light beams 521, 522 parallel to each other.

The convergent lens 53 is disposed between the light reflector and the photosensitive polymer layer 30. The reflection and transmission polarized light beams 521, 522 passes through the convergent lens 53, and converge at the photosensitive polymer layer 30.

Figure 3:
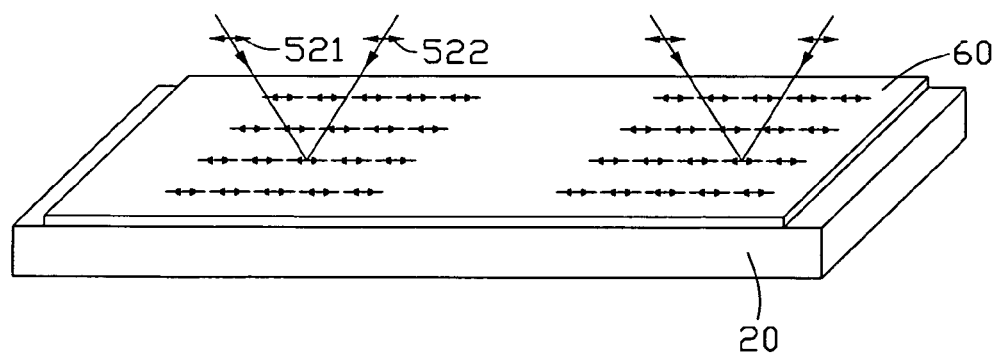
FIG. 3 is similar to FIG. 2, but showing the polymer layer transformed whereby the substrate having an alignment layer formed thereon is obtained.

Referring also to FIG. 3, the reflection and transmission polarized light beams 521, 522 interfere with each other at the photosensitive polymer layer 30. Distributions of different light intensities along interference fringes causes the molecules of the photosensitive polymer layer 30 to align in parallel rows parallel to the X-axis. Thereby, an alignment layer 60 having an electric-field component along the X-axis is obtained.

Figure 4:
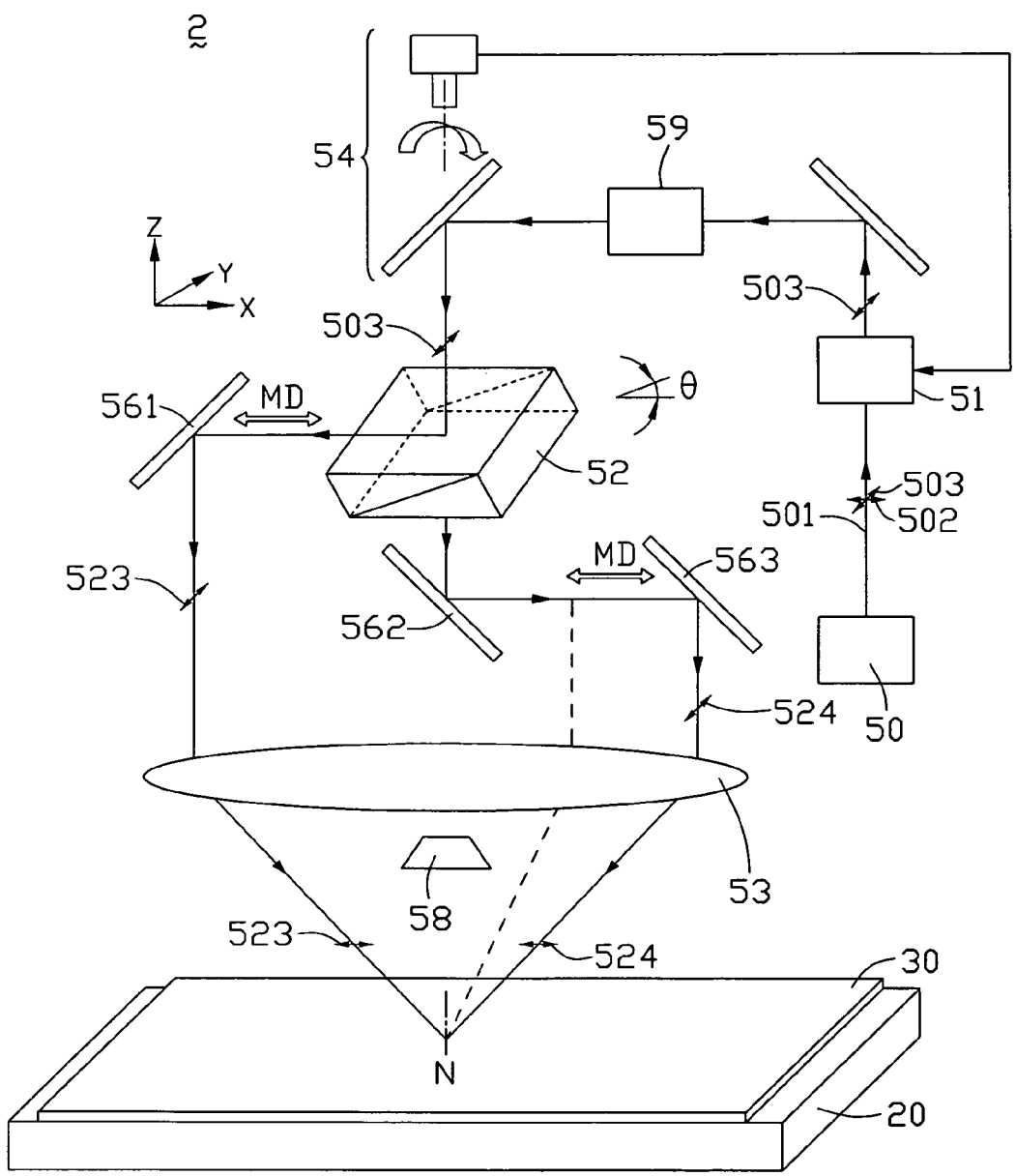
FIG. 4 is similar to FIG. 1, but showing aspects of alternative operation of the alignment apparatus including essential optical paths.
Figure 5:
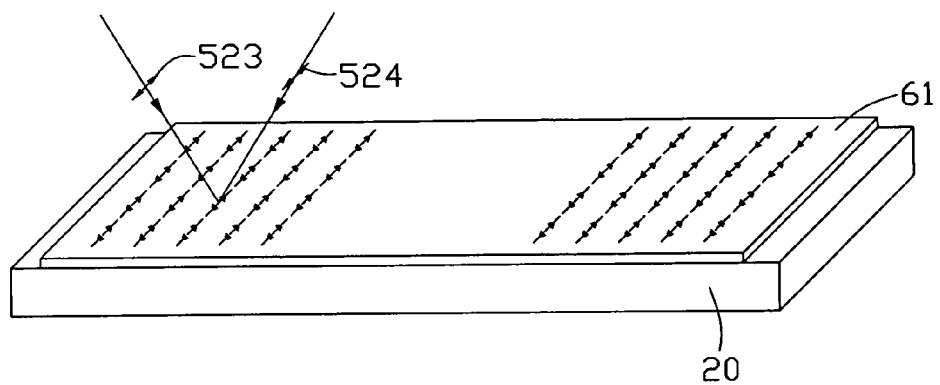
FIG. 5 is a schematic, isometric view of a substrate having an alignment layer formed thereon according to the alternative operation described above in relation to FIG. 4.

Referring to FIG. 4 and FIG. 5, in alternative operation, the deep-UV light 501 is transformed into a reflection polarized light beams 523 and a transmission polarized light beams 524, each having vertical electric-field components 503 along the Y-axis. The reflection and transmission polarized light beams 523, 524 have the capability to interfere with each other. Distributions of different light intensities along interference fringes causes the molecules of the photosensitive polymer layer 30 to align in parallel rows parallel to the Y-axis. Thereby, an alignment layer 61 having an electric-field component along the Y-axis is obtained.

A distance that light propagates for a certain period of time in a certain medium multiplied by a refractivity of the medium is defined as an optical path of the light. Such optical path is also a distance that the light propagates in vacuum for the same period of time. Two light beams interfere with each other when the optical path difference therebetween is defined herein as $\Delta L$. Referring to FIG. 1 and FIG. 4, L1 is defined herein to represent a propagation distance of the reflection polarized light beams 521, 523 before reaching the photosensitive polymer layer 30, and L2 is defined herein to represent a propagation distance of the transmission polarized light beams 522, 524 before reaching the photosensitive polymer layer 30. It is only when $L2-L1<\Delta L$ that the reflection polarized Light beams 521, 523 and the transmission polarized Light beams 522, 524 can interfere with each other, respectively. When the molecules of the photosensitive polymer layer 30 absorb the photon energy of the interfering Light beams, the intermolecular binding of the molecules is weakened or destroyed.

Figure 6:
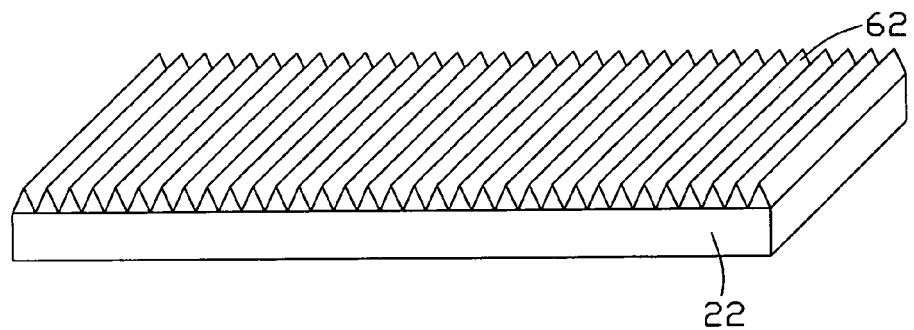
FIG. 6 is an isometric view of a substrate having an alignment layer with asymmetric pretilt angles formed thereon according to another alternative operation of the alignment apparatus of FIG. 1.

In addition, the first and third reflecting mirrors 561, 563 can be horizontally moved along the X-axis, so as to adjust incident angles of the interfering Light beams relative to the photosensitive polymer layer 30. Thereby asymmetric pretilt angles of the photosensitive polymer layer 30 can be formed. Referring to FIG. 6, a plurality of micro grooves 62 are formed on a substrate 22 after this kind of alignment process. A period P of the micro grooves 62 is calculated according to the following formula: $P=\lambda/(2 \sin \theta 3)$, wherein $\lambda$ represents a wavelength of the reflection polarized Light beams 521, 523 and the transmission polarized Light beams 522, 524, $\theta 3$ represents $(\theta 1+\theta 2)/2$, $\theta 1$ represents an angle of the reflection polarized light beams 521, 523 relative to the normal line N, and $\theta 2$ represents an angle of the transmission polarized light beams 522, 524 relative to the normal line N. Different wave-lengths of the light determine different periods of the micro grooves 62 and different pretilt angles.

The vent-pipe 58 is disposed adjacent the substrate 20 having the photosensitive polymer layer 30, and is used to discharge gases and particles produced by chemical reactions when the photosensitive polymer layer 30 is irradiated.

Besides deep-UV light, extreme ultraviolet light having a wavelength in the range from 1~100 nanometers may instead be used. For example, extreme ultraviolet light having a wavelength of 13 nanometers has a photon energy of 95 eV. After the photosensitive polymer layer 30 receives the ultraviolet light having high photon energy, the micro grooves 62 are formed, as shown in FIG. 6. Because liquid crystal molecules are deformed little if at all when their long axes are parallel to the micro grooves 62, the liquid crystal molecules of an associated LCD are apt to align parallel to the micro grooves 62. Because almost all materials can absorb ultraviolet having a wavelength in the range from 1~100 nanometers, the reflecting mirrors 561, 562, 563 preferably are reflecting mirrors having large grazing angles.

Figure 7:
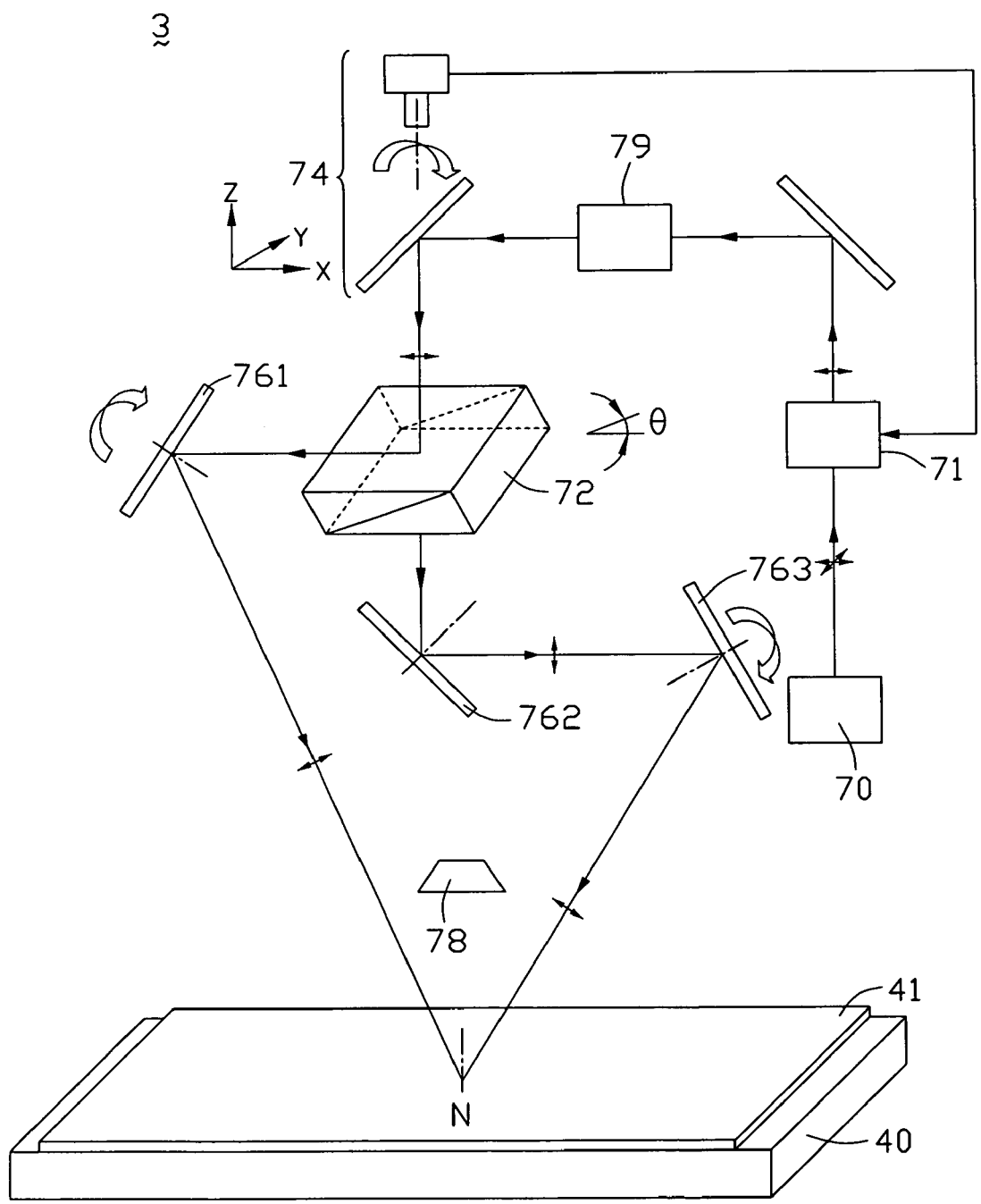
FIG. 7 is a diagram of an alignment apparatus according to a second embodiment of the present invention, showing aspects of operation of the alignment apparatus including essential optical paths.

Referring to FIG. 7, an alignment apparatus 3 according to a second embodiment of the present invention is shown. The alignment apparatus 3 includes a light source 70, a polarized light generator 71, a polarized light separator 72, a light controller 74, a light reflector (not labeled), a vent-pipe 78, and a light intensity controller 79. The polarized light separator 72 may be a holographic diffractive optical element. The light reflector includes a first reflecting mirror 761, a second reflecting mirror 762, and a third reflecting mirror 763. Angles of the first and third reflecting mirrors 761, 763 relative to the horizontal plane are adjusted, so that a reflection polarized light beam and a diffraction light beam converge onto a photosensitive polymer layer 41 formed on a substrate 40.

Unlike with conventional alignment apparatuses, because the alignment apparatuses 2, 3 are no-rubbing, no-contact alignment apparatuses, debris and electrostatic charge are avoided or even eliminated.

An alignment method according to another embodiment of the present invention includes the following steps: providing two polarized light beams having capability to interfere with each other, and utilizing the two polarized light beams to interferingly irradiate a photosensitive polymer layer, thereby obtaining an alignment layer.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An alignment apparatus comprising:
   a light source for emitting light;
   a polarized light generator for receiving the light and generating polarized light;
   a polarized light separator for receiving the polarized light and separating the polarized light into two polarized light beams having capability to interfere with each other; and
   a light directing member for making the two polarized light beams converge and interferingly irradiate a photosensitive polymer layer to obtain an alignment layer.

2. The alignment apparatus as claimed in claim 1, wherein the polarized light separator is a transmission optical splitter, and separates the polarized light into a reflection polarized light beam and a transmission polarized light beam.

3. The alignment apparatus as claimed in claim 1, further comprising a light reflector disposed between the polarized light separator and the light directing member, and configured for changing transmission directions of the two interfering polarized light beams to make the two interfering polarized light beams parallel to each other.

4. The alignment apparatus as claimed in claim 3, wherein the light reflector comprises a first reflecting mirror for changing a transmission direction of one of the two polarized light beams, and a second and a third reflecting mirrors for cooperatively changing a transmission direction of the other polarized light beam.

5. The alignment apparatus as claimed in claim 1, further comprising a light controller for controlling an incident angle of the polarized light relative to the polarized light separator.

6. The alignment apparatus as claimed in claim 1, further comprising a light intensity controller disposed between the polarized light generator and the polarized light separator.

7. The alignment apparatus as claimed in claim 1, wherein the light source is a high voltage light source, and emits deep ultraviolet light or extreme ultraviolet light.

8. The alignment apparatus as claimed in claim 1, wherein the light emitted from the light source has a wavelength in the range from 1~250 nanometers.

9. The alignment apparatus as claimed in claim 1, wherein the light directing member is a convergent lens.

10. An alignment method comprising:
    providing two polarized light beams having capability to interfere with each other; and
    utilizing the two polarized light beams to interferingly irradiate a photosensitive polymer layer, thereby obtaining an alignment layer.

11. The method as claimed in claim 10, wherein a wavelength of the polarized light beams is in the range from 1~250 nanometers.

12. The method as claimed in claim 10, wherein the polarized light beams are deep ultraviolet light beams or extreme ultraviolet light beams.

13. An alignment apparatus comprising:
    a light source for emitting light;
    a polarized light generator for receiving the light and generating polarized light;
    a polarized light separator for receiving the polarized light and separating the polarized light into two polarized light beams having capability to interfere with each other; and
    a light directing member for changing transmission directions of the two polarized light beams to make the two polarized light beams converge and interferingly irradiate a photosensitive polymer layer to obtain an alignment layer.

14. The alignment apparatus as claimed in claim 13, wherein the polarized light separator is a holographic diffractive optical element, and separates the polarized light into a reflection polarized light beam and a diffraction polarized light beam.

15. The alignment apparatus as claimed in claim 13, wherein the light directing member is a light reflector.

16. The alignment apparatus as claimed in claim 15, wherein the light reflector comprises a first reflecting mirror for changing a transmission direction of the reflection polarized light, and a second and a third reflecting mirrors for cooperatively changing a transmission direction of the diffraction polarized light.

17. The alignment apparatus as claimed in claim 13, further comprising a light controller for controlling an incident angle of the polarized light when the polarized light enters the polarized light separator.

18. The alignment apparatus as claimed in claim 13, further comprising a light intensity controller disposed between the polarized light generator and the polarized light separator.

19. The alignment apparatus as claimed in claim 13, wherein the light source is a high voltage light source, and emits deep ultraviolet light or extreme ultraviolet light.

20. The alignment apparatus as claimed in claim 13, wherein the two polarized light beams are perpendicular to each other in a non-interference manner, optical paths of the two polarized light beams converged to the photosensitive polymer layer are different from each other, and said different optical paths have different lengths.

* * * * *